United States Patent
Aarts

(10) Patent No.: US 6,186,051 B1
(45) Date of Patent: Feb. 13, 2001

(54) SYSTEM AND APPARATUS FOR PREPARING A BEVERAGE SUITABLE FOR CONSUMPTION

(75) Inventor: Mathias Leonardus Cornelis Aarts, Bilthoven (NL)

(73) Assignee: Sara Lee/De N.V., Utrecht (NL)

( * ) Notice: Under 35 U.S.C. 154(b), the term of this patent shall be extended for 0 days.

(21) Appl. No.: 08/903,895

(22) Filed: Jul. 31, 1997

(51) Int. Cl.$^7$ ........................................... A47J 31/24
(52) U.S. Cl. ...................... 99/295; 99/302 R; 426/112; 426/433; 426/435
(58) Field of Search ...................... 426/433, 435, 426/77, 78, 79, 84, 112; 99/295, 302 R, 302 P, 304, 306, 287

(56) References Cited

U.S. PATENT DOCUMENTS

| | | | |
|---|---|---|---|
| 3,292,527 | * 12/1966 | Stasse | 426/77 |
| 3,344,734 | * 10/1967 | Aguirre-Batres et al. | 426/77 |
| 3,347,151 | * 10/1967 | Ronalds | 426/77 |
| 3,372,634 | * 3/1968 | Brinkman et al. | 426/77 |
| 3,545,983 | 12/1970 | Woods . | |
| 3,607,297 | * 9/1971 | Fasano | 426/433 |
| 3,628,444 | * 12/1971 | Nazza | 99/295 |
| 3,719,505 | * 3/1973 | Mazza | 99/295 |
| 3,812,273 | * 5/1974 | Schmidt | 426/433 |
| 3,854,389 | * 12/1974 | Hillemann | 99/295 |
| 4,136,202 | * 1/1979 | Favre | 426/77 |
| 4,581,239 | * 4/1986 | Woolman et al. | 426/433 |
| 4,724,752 | * 2/1988 | Aliesch et al. | 99/302 R |
| 4,738,378 | * 4/1988 | Oakley et al. | 426/433 |
| 4,818,544 | * 4/1989 | Seward | 426/77 |
| 4,846,052 | * 7/1989 | Favre et al. | 99/295 |
| 4,886,674 | * 12/1989 | Seward et al. | 426/77 |
| 5,009,318 | 4/1991 | Lepinoy . | |
| 5,272,960 | * 12/1993 | Kinna | 99/287 |
| 5,325,765 | * 7/1994 | Sylvan et al. | 426/433 |
| 5,327,815 | * 7/1994 | Fond et al. | 99/295 |
| 5,331,789 | 7/1994 | Cur et al. . | |
| 5,388,910 | 2/1995 | Koyanagi . | |
| 5,398,595 | * 3/1995 | Fond et al. | 99/295 |
| 5,472,719 | * 12/1995 | Favre | 426/433 |
| 5,501,525 | 3/1996 | Cox et al. . | |
| 5,603,254 | * 2/1997 | Fond et al. | 426/433 |
| 5,773,067 | * 6/1998 | Freychet et al. | 426/433 |
| 5,794,519 | * 8/1998 | Fischer | 99/295 |

FOREIGN PATENT DOCUMENTS

| | | | |
|---|---|---|---|
| 0002987 | * 7/1979 | (EP) | 99/287 |
| 0 121 211 | 10/1984 | (EP) . | |
| 179 641 | 4/1986 | (EP) . | |
| 272 922 | 6/1988 | (EP) . | |
| 278 773 | 8/1988 | (EP) . | |

(List continued on next page.)

Primary Examiner—Steven Weinstein
(74) Attorney, Agent, or Firm—Merchant & Gould P.C.

(57) ABSTRACT

A system for preparing a consumable beverage, wherein a liquid and a granular material are brought together to produce the beverage. The system includes at least one vacuum pack enclosing a beverage making granular material therein. The free end of the pack defines a longitudinal narrow gap, and a closing seam adjacent the free end that retains the granular material within the vacuum pack. A holder is configured to receive and fully enclose the vacuum pack therein. A liquid dispensing mechanism is provided for dispensing a liquid. A needle-shaped tube connects to the liquid dispensing mechanism and includes a free end for piercing the vacuum pack and introducing the liquid into the vacuum pack. The holder includes an opening at one end to allow the end of the vacuum pack to extend below the holder when the vacuum pack is placed within the holder, and the holder further includes a movable sidewall positioned to engage the opposite end of the vacuum pack. A drive mechanism connected to the movable sidewall forcibly presses the movable sidewall against the opposite end whereby the vacuum pack is tightly pressed against the holder. Clamping plates are positioned to press against the portion of the vacuum pack that extends below the holder to maintain the narrow gap once the closing seam is opened by the internal pressure.

2 Claims, 6 Drawing Sheets

FOREIGN PATENT DOCUMENTS

| | | |
|---|---|---|
| 0 441 189 | 8/1991 | (EP) . |
| 0 475 514 | 3/1992 | (EP) . |
| 2079331 | 12/1971 | (FR) . |
| 2620921 * | 3/1989 | (FR) ................................. 99/302 R |
| 1051012 | 12/1966 | (GB) . |
| 1 296 013 | 11/1972 | (GB) . |
| 2023086 * | 12/1979 | (GB) ................................. 426/433 |
| 2121762 * | 1/1984 | (GB) ...................................... 426/77 |
| 2123685 | 2/1984 | (GB) . |
| 2215189 * | 9/1989 | (GB) ................................. 99/302 R |
| 4-1422267 * | 5/1992 | (JP) ...................................... 426/77 |
| 4-142266 * | 5/1992 | (JP) ...................................... 426/77 |
| 4-142268 * | 5/1992 | (JP) ...................................... 426/77 |
| 9001945 | 9/1990 | (NL) . |
| WO 94/27482 | 12/1994 | (WO) . |

\* cited by examiner

SYSTEM AND APPARATUS FOR PREPARING A BEVERAGE SUITABLE FOR CONSUMPTION

The invention relates to a method for preparing a beverage suitable for consumption, and to a system and apparatus for carrying out such method.

More in particular, the invention relates to a method for preparing a beverage suitable for consumption such as coffee, wherein a liquid and a granular material such as ground coffee are brought together to produce the beverage.

Such apparatuses and methods are known per se. In the known apparatus and method for preparing coffee, for instance ground coffee is introduced in a bowl-shaped container. This bowl-shaped container is open at its top side, while in the bottom of the container a large number of small orifices have been provided. These small orifices form a barrier to the ground coffee. Next, hot water is fed under high pressure to the ground coffee via the open top side. The coffee extract thus formed in the container can leave the container via the small orifices to be subsequently received in a cup disposed therebelow.

A drawback of this known system is that preparing coffee in this manner takes up relatively much time. In particular the filling of the bowl-shaped container with ground coffee costs much time. Also, it is not guaranteed that the right amount of coffee is included into the container for obtaining coffee of the desired taste. Moreover, it is not guaranteed that always the right quality of coffee is introduced into the container. When the ground coffee has been stored for a considerable time in for instance a coffee canister, the aroma may have largely disappeared, so that the beverage eventually obtained does not meet the highest requirements. In particular in hotels, restaurants, cafes, etc., this involves a substantial drawback. It is an object of the invention to provide a solution to this problem. It is a particular object of the invention to provide a method and apparatus suitable for preparing only one consumption.

According to the invention, the method comprises a number of steps, wherein:

a vacuum pack made from a thin-walled and flexible packing sheet (foil) is placed in a holder which, in use, tightly encloses the vacuum pack at least partially, the vacuum pack being filled with the granular material and comprising a closing seam interconnecting opposite parts of the packing sheet;

a free end of at least one needle-shaped tube is introduced into the inner space of the vacuum pack; and wherein via the needle-shaped tube, a liquid is fed under pressure to the inner space of the vacuum pack, so that under the influence of the liquid pressure in the vacuum pack, this closing seam opens at least partially, with the beverage formed in the vacuum pack flowing out of the vacuum pack via the opening.

As the beverage is made from the granular material contained in the vacuum pack, it is guaranteed that the granular material is fresh at all times. The free end of the needle-shaped tube can for instance be brought into the inner space of the vacuum pack by pricking it through the flexible packing sheet immediately before the moment when the consumption is to be prepared. It is also guaranteed that at all times a proper amount of granular material is used for preparing the beverage. Indeed, the vacuum pack may have been manufactured in advance, so that it is determined from the factory what amount of granular material should be used for preparing for instance a one-cup consumption.

According to a particular aspect of the invention, the vacuum pack is opened as a result of the liquid pressure in the inner space of the vacuum pack. This pressure is created by the liquid that is fed to the inner space of the vacuum pack via the needle-shaped tube. Thus, a particularly great ease of use is guaranteed, because a user does not have to open the vacuum pack with his own hands, with the risk of granular material falling from the opened vacuum pack.

According to a particular aspect of the invention, opposite and at least substantially abutting parts of the packing sheet are pressed towards each other adjacent the closing seam, so that at least one narrow gap between these parts forms a filter which passes the beverage and forms a barrier to the granular material.

According to an alternative embodiment of the invention, opposite parts of the packing sheet adjacent the closing seam are attached to each other at a number of different positions, so that between these positions gaps are formed which act as a filter which passes the beverage and forms a barrier to the granular material.

In particular, the holder comprises relatively movable sidewalls that are pressed against the vacuum pack during at least a portion of the period in which, via the needle-shaped tube, a liquid is fed to the vacuum pack. It is thus ensured that it is possible to create a high pressure in the vacuum pack without involving the risk of the vacuum pack being blown up. The holder then provides that the vacuum pack can properly withstand the internal high pressure.

According to a highly advanced embodiment of the method, the vacuum pack comprises a rectangular bottom wall having a first and a second pair of opposite longitudinal edges, two opposite rectangular vertical sidewalls extending in upward direction towards each other from the first pair of longitudinal edges and interconnected at their top sides via the closing seam, and two opposite, triangular vertical sidewalls extending in upward direction from the second pair of longitudinal edges; and the holder comprises two opposite vertical sidewalls, wherein the distance between these sidewalls at a top side of the holder is greater than the distance between the sidewalls at a bottom side of the holder, the holder is at its bottom side provided with an opening, and wherein the vacuum pack is placed in the holder in such a manner that the bottom wall of the vacuum pack faces upwards while the closing seam of the vacuum pack faces downwards. In this embodiment, the needle-shaped tube will preferably be pricked through the bottom wall of the vacuum pack.

A system for preparing a beverage suitable for consumption, such as coffee, wherein a liquid and a granular material such as ground coffee are brought together to produce the beverage, is characterized in that the system comprises at least one vacuum pack that is manufactured from a thin-walled and flexible packing sheet and has a closing seam interconnecting opposite parts of the packing sheet, and is filled with the granular material, and an apparatus comprising a holder filled with the vacuum pack, liquid-dispensing means for dispensing the liquid and a needle-shaped tube connected to the liquid-dispensing means, wherein the system further comprises filter means and wherein, in use, the holder encloses the vacuum pack substantially tightly, a free end of the needle-shaped tube extends into the vacuum pack via an opening in the vacuum pack, the liquid-dispensing means supply liquid to the inner space of the vacuum pack via the needle-shaped tube, the closing seam opens at least partially under the influence of the liquid pressure in the vacuum pack, whereupon the beverage formed in the vacuum pack leaves the vacuum pack via the closing seam and the filter means.

The invention further relates to an apparatus comprising a holder for receiving a vacuum pack made from a thin-walled and flexible packing sheet, which vacuum pack comprises a closing seam interconnecting opposite parts of the packing sheet and is filled with the granular material, liquid-dispensing means for dispensing the liquid and a needle-shaped tube connected to the liquid-dispensing means, wherein the holder comprises relatively movable sidewalls and pressure means for pressing these sidewalls against the vacuum pack.

BRIEF DESCRIPTION OF THE DRAWINGS

The invention will now be specified with reference to the accompanying drawings. In these drawings:

In FIGS. 1 and 2, a possible embodiment of a vacuum pack is shown by reference numeral 1. The vacuum pack 1 is made from a flexible packing sheet (foil) 2 and is in this example filled with ground coffee 4. The vacuum pack 1 comprises a rectangular bottom wall 6 having a first pair 8 and a second pair 10 of opposite longitudinal edges. The vacuum pack further comprises two opposite rectangular vertical sidewalls 12, extending towards each other in upward direction from the first pair of longitudinal edges 8. At their top sides, the vertical sidewalls 12 are interconnected via a closing seam 14. This closing seam 14 can for instance be provided through heat-sealing. The vacuum pack further comprises two opposite triangular vertical sidewalls 16 extending in upward direction from the second pair of longitudinal edges 10.

FIG. 2 shows a system 18 comprising the vacuum pack according to FIGS. 1A and 1B and an apparatus 20 in which the vacuum pack 1 is included for the preparation of, in this case, one cup of coffee.

Figure 1A:
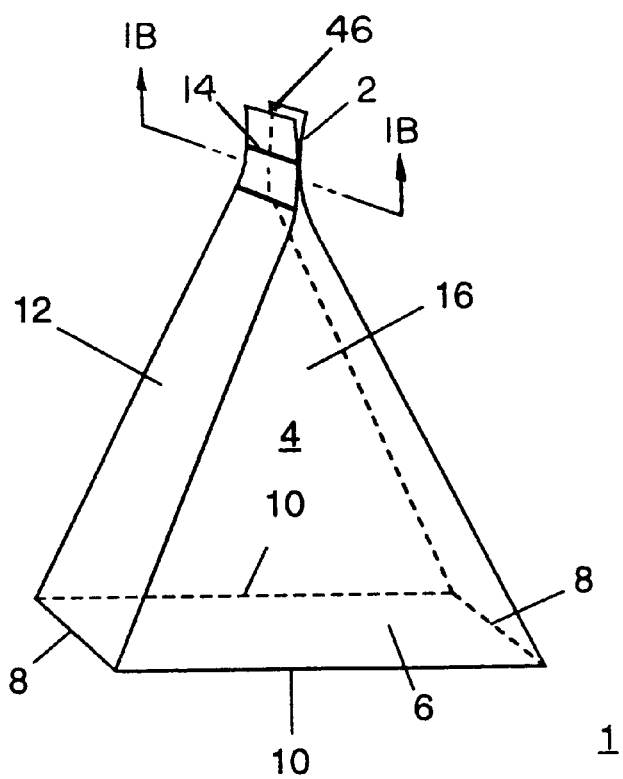
FIG. 1A shows, in perspective, a possible embodiment of a vacuum pack according to the invention.

The apparatus comprises a holder 22 filled with the vacuum pack 1. The apparatus further comprises liquid-dispensing means for dispensing liquid. In this case, the liquid-dispensing means dispense under high pressure of for instance 2–6 atm hot water to a conduit 28 via an outlet 26. In this example, the conduit 28 is manufactured from a flexible material. The conduit 28 feeds the hot water to a needle-shaped tube 30.

The apparatus further comprises drive means 32 for moving the needle-shaped tube 30 to and fro in its longitudinal direction relative to the holder 22. In this example, the holder 22 is of funnel-shaped design so that the sidewalls of the holder tightly enclose the vacuum pack when the vacuum pack is positioned upside down in the holder (see also FIG. 2). The holder has its top side provided with a rigid sidewall 34 which is movable relative to the other rigid sidewalls of the holder 22. For this purpose, the sidewall 34 is connected to a drive mechanism 38 by means of a shaft 36. By means of the drive mechanism 38, the sidewall 34 can be moved up and down. Provided in the sidewall 34 is an opening 40, enabling the needle-shaped tube 30 to extend through this opening into the inner space of the holder 22 and, accordingly, into the inner space of the vacuum pack 1. Further, at the bottom side of the holder 22, a slotted outlet opening 42 is provided, through which the flap-shaped top end 44 of the vacuum pack reaches outside. As can best be seen in FIG. 1B, flap of the vacuum pack has a gap 46 at its top side, which gap is formed by opposite sidewalls 12 of the vacuum pack 1. As will be specified hereinbelow, according to a particular aspect of the invention, this gap may act as filter means which passes a liquid and forms a barrier to the granular material contained in the vacuum pack.

The apparatus further comprises opposite clamping means 48 which, in use, can press the above-mentioned opposite sidewalls of the flap-shaped portion 44 of the vacuum pack 1 towards each other to obtain a narrow gap between these sidewalls 12 of the vacuum pack. The clamping means 48 consist of two flat plates 50 located on either side of the flap-shaped part 44 that can be moved towards and from each other by means of drive means 52. The apparatus further comprises a control unit 54 controlling the liquid-dispensing means 24, the drive means 32, the drive mechanism 38 and the drive means 52.

Figure 1B:
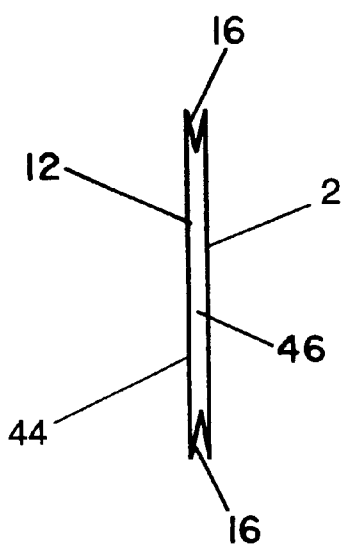
FIG. 1B is a cross-sectional view taken along 1B—1B in FIG. 1A illustrating the gap at the end of the vacuum pack.
Figure 2:
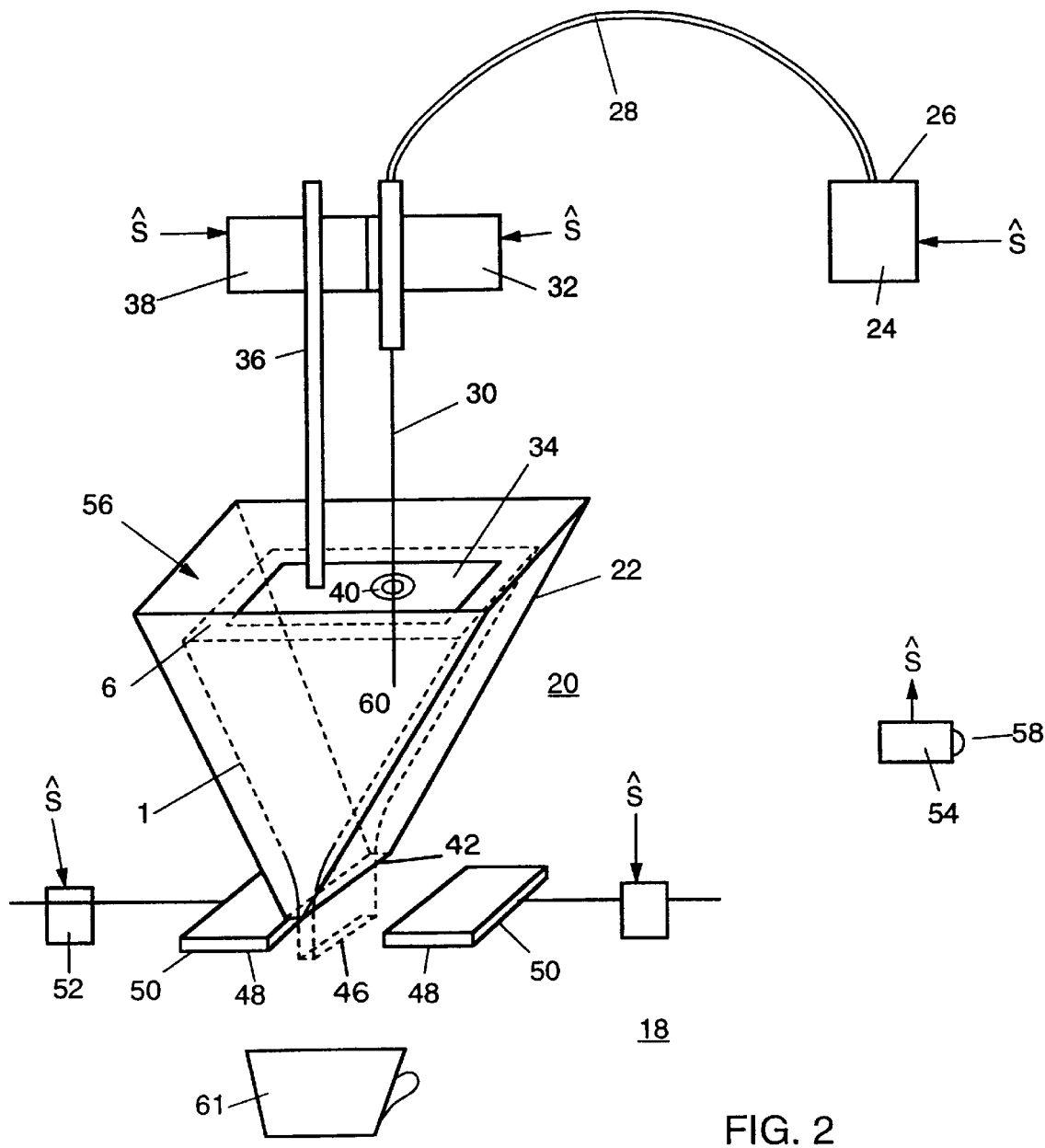
FIG. 2 shows a possible embodiment of a system and an apparatus according to the invention for performing a method according to the invention.

The operation of the apparatus according to FIG. 2 is as follows. By means of signals Ŝ, the control unit 54 controls the drive means 32 and the drive mechanism 38 so that the needle-shaped tube 30 and the sidewall 34 are moved upwards. This involves the top side of the holder 22 becoming entirely clear. Via the opening 56, a vacuum pack as shown in FIG. 1 can now be inserted into the holder 22. When this has been done, a user can for instance press a button 58 of the control unit 54 to indicate that now a new consumption can be prepared. The control unit 54 activates the drive mechanism 38 so that the sidewall 34 is moved down until it touches the rectangular bottom wall 6 of the vacuum pack 1. Then, the drive mechanism 38 continues pressing the sidewall 34 against the bottom wall 6 of the vacuum pack 1. As a result, the vacuum pack 1 is pressed down as a whole. Owing to the funnel shape of the holder 22, the sidewalls of the holder will enclose the vacuum pack tightly. Also, the control unit 54 controls the drive means 52 so that the flat plates are pressed towards each other. As a result, the clamping means, located in the flap-shaped portion 44, press the opposite sidewalls of the vacuum pack together to obtain a narrow gap 46 between these sidewalls of the vacuum pack. The control unit 54 controls the drive mechanism 32 for moving the needle-shaped tube 30 downwards. This will involve the needle-shaped tube 30 being moved through the opening 40 of the sidewall 34. As a result, the free end 60 of the needle-shaped tube 30 will draw an opening in the bottom wall 6 of the vacuum pack. The needle-shaped tube 30 will now extend into the inner space of the vacuum pack 1. Then, the control unit 54 activates the liquid-dispensing means 24. This causes hot water to be fed to the needle-shaped tube 30 via the conduit 28. The hot water will be forced into the inner space of the vacuum pack 1 via the open end 60 of the needle-shaped tube. Because of the supply of the hot water to the inner space of the vacuum pack 1, the pressure in the vacuum pack will increase. As the vacuum pack is tightly enclosed by the holder 22 on all sides, the vacuum pack will not bulge notably as a result of the high internal pressure. However, the pressure on the closing seam 14 will increase substantially. At a given moment, the pressure will have increased thus highly that the closing seam 14 bursts open. This will permit the extract meanwhile formed in the vacuum pack 1 to flow out of the vacuum pack 1 via the gap 46, to be for instance received in a container 61. The narrow gap 46 here acts as a filter which forms a barrier to granular material in the vacuum pack and which passes the coffee extract formed. The clamping means 48 provide that this gap remains sufficiently narrow to be able to function properly as a filter. Next, the control unit 54 stops the liquid-dispensing unit 24 when the right amount of hot water has been dispensed. The extract beverage contained in the container 61 is now ready for consumption. The control unit 54 then activates the drive means 52 for moving the flat plates 50 apart. The control unit 54 also activates the drive means 32 for moving the needle-shaped tube 30 upwards so that it is pulled from the used vacuum pack 1. Then, the drive mechanism 38 is activated for moving the sidewall 34 upwards. The used vacuum pack 1 can now be removed from the holder 22, after which the apparatus is ready to be filled with a new vacuum pack 1 for preparing coffee afresh as described hereinabove. It is observed that in the embodiment according to FIG. 2, the apparatus comprises relatively movable sidewalls (sidewall 34 relative to other sidewalls of the holder 22) and pressure means (drive mechanism 38) for pressing these sidewalls against the vacuum pack during at least a portion of the period in which a liquid is fed to the vacuum pack via the needle-shaped tube.

Figure 3A:
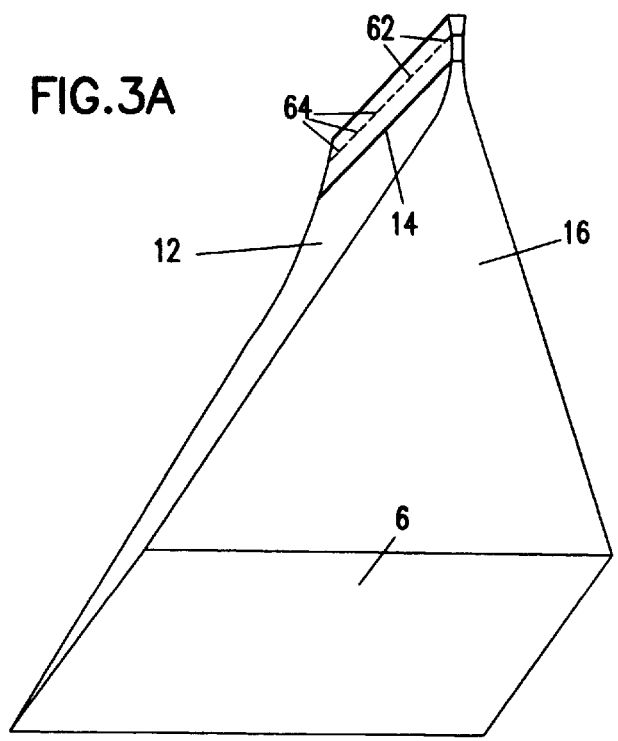
FIG. 3A shows, in perspective, a second possible embodiment of a vacuum pack according to the invention.
Figure 3B:
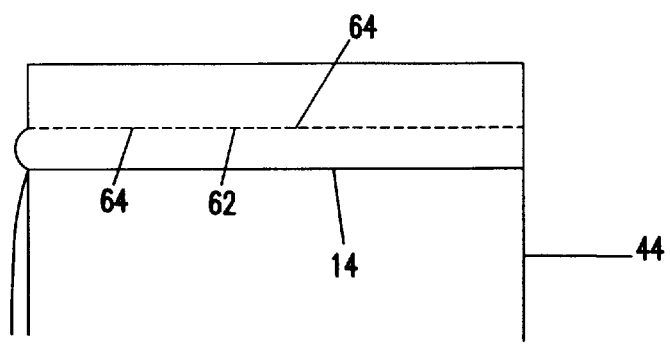
FIG. 3B shows a portion of a side elevation, in transparent view, of the vacuum pack according to FIG. 3A.

According to a particular variant, the clamping means 48 of the apparatus 20 are omitted. In that case, however, a slightly modified type of vacuum pack is used, as shown in FIGS. 3A and 3B. The vacuum pack according to FIGS. 3A and 3B is characterized in that the opposite sidewalls 16 of the vacuum pack 1 in the flap-shaped portion 44 are attached to each other at a number of positions 62 in such a manner that gaps 64 are formed between these positions. These gaps 64 now form the above-mentioned filter means. The attachment of the opposite sidewalls of the packing sheet at position 62 is of such a strong design, for instance by means of heat-sealing, that this attachment is not broken when the liquid pressure in the pack is substantially increased. When coffee is to be prepared by means of the vacuum pack according to FIGS. 3A and 3B, this pack is placed in the holder 22 as discussed in respect of FIG. 2. The control unit 54 will activate the drive mechanism 38 for pressing the sidewall 34 downwards. When the vacuum pack is thus tightly enclosed by the holder 22, the control unit 54 activates the drive means 32 so that the needle-shaped tube 30 is moved downwards. By means of the free end 60, a puncture is made in the bottom of the vacuum pack, as described hereinabove. Then, the control unit 54 activates the liquid-dispensing means for feeding hot water to the inside of the vacuum pack 1. Because of the high pressure in the vacuum pack, the closing seam 14, in this example located between the bottom wall 6 and the gaps 64 of the vacuum pack, will be pulled open. Next, the coffee extract will leave the vacuum pack 1 via the gaps 64 to be received in the bowl 61. However, the gaps 64 are thus narrow that the ground coffee 4 does not leave the vacuum pack.

It is observed that it is also possible that in the vacuum pack according to FIG. 3A, the positions 62 and the gaps 64 are located between the closing seam 14 and the bottom wall 10. Such variants are all understood to fall within the framework of the invention.

Figure 4A:
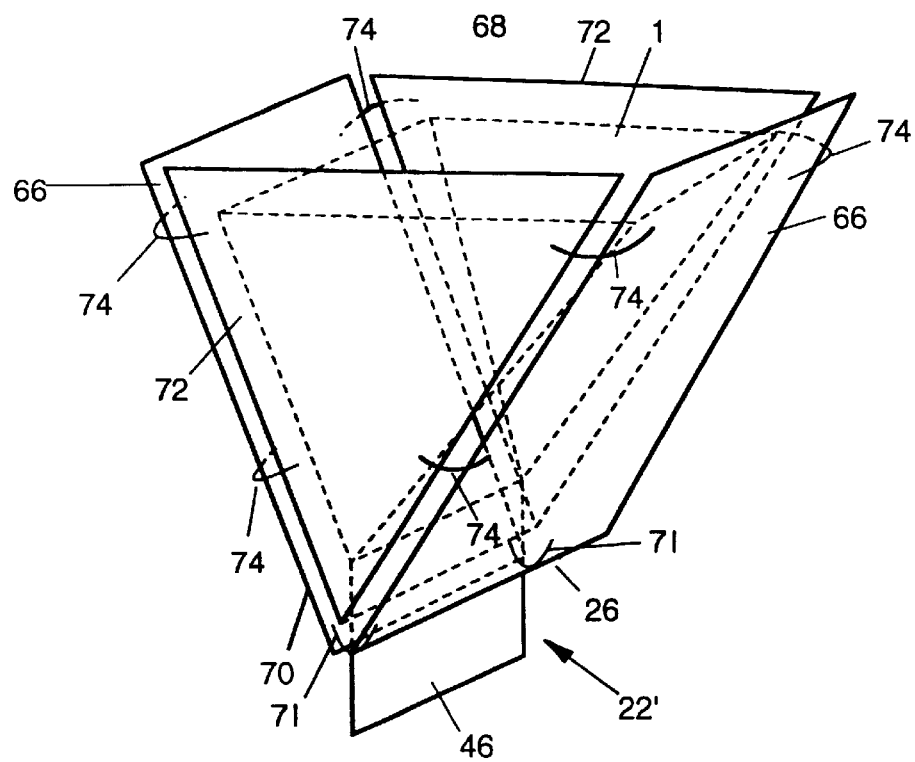
FIG. 4A shows a holder of an alternative embodiment of the apparatus according to FIG. 2.
Figure 4B:
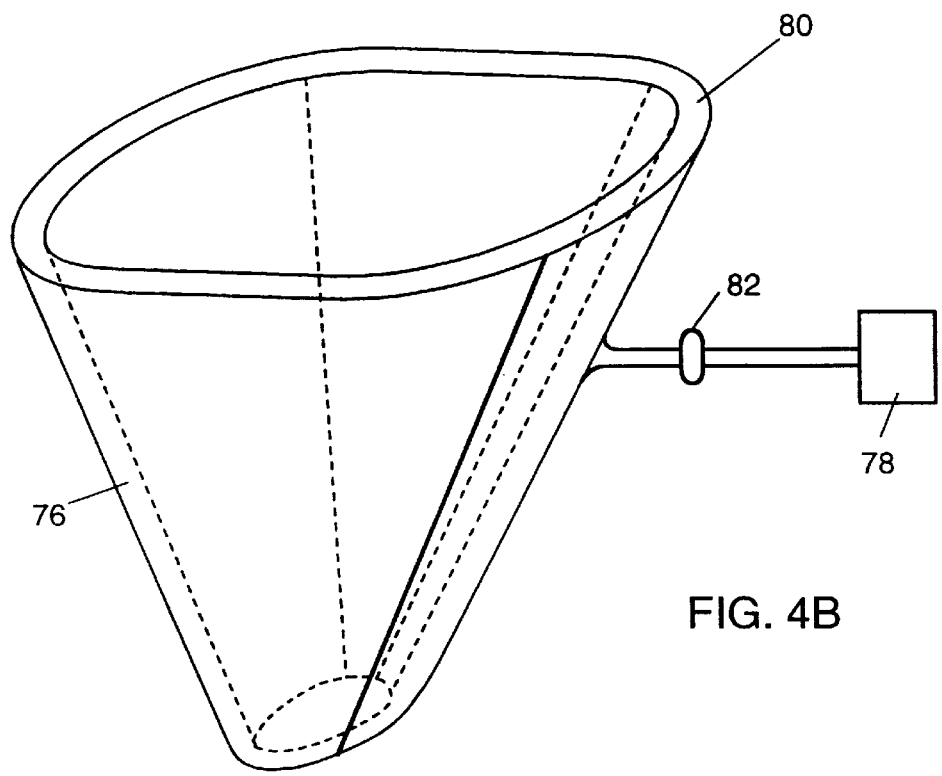
FIG. 4B shows a flexible envelope in which the holder according to FIG. 1A in the alternative embodiment according to FIG. 2 is placed.
Figure 4C:
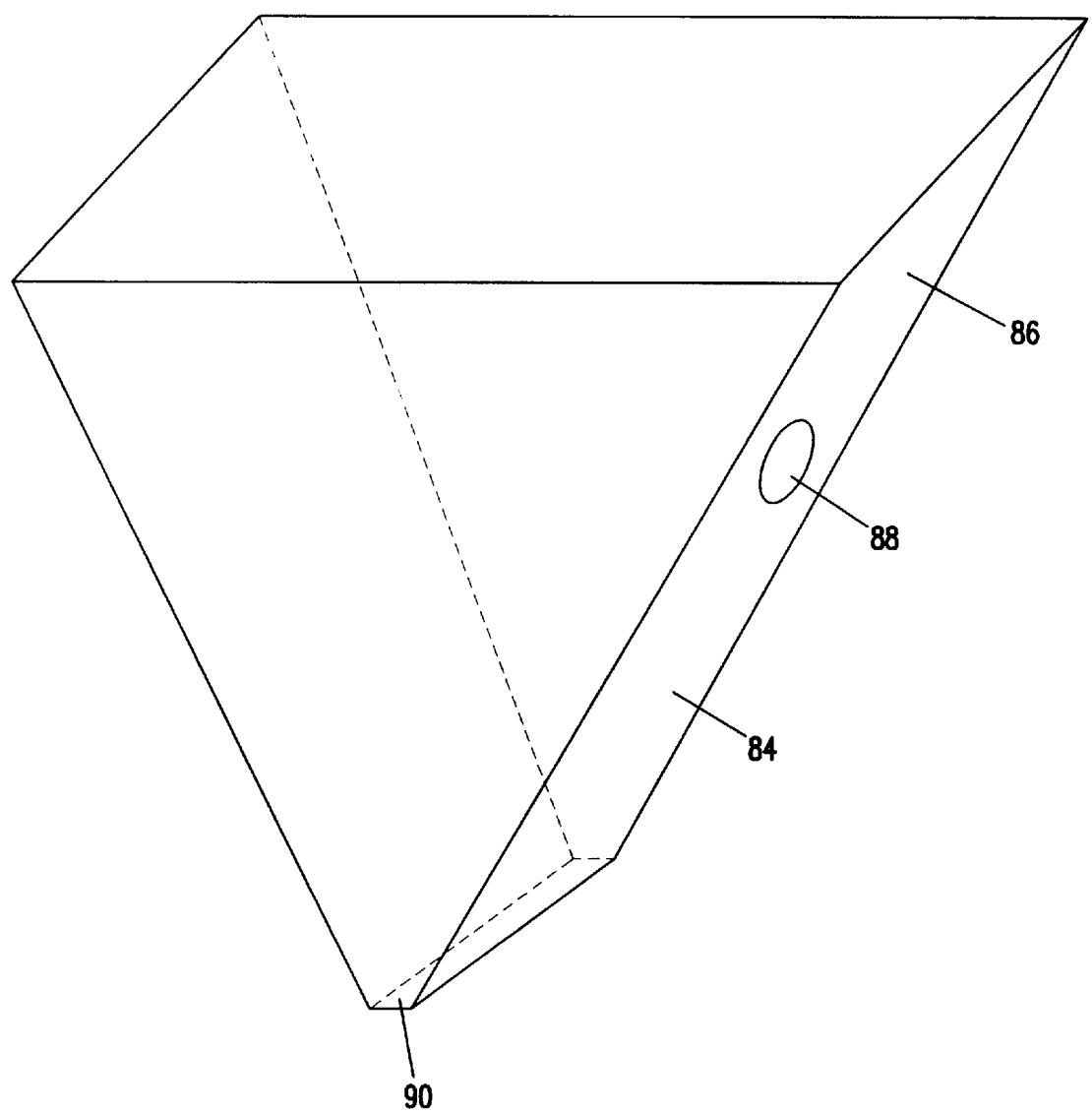
FIG. 4C shows the rigid housing in which the flexible envelope of FIG. 4B in the alternative embodiment according to FIG. 4B is placed.

With reference to FIG. 4, an alternative embodiment of an apparatus according to the invention will now be described. According to this embodiment, the complete holder 22, except the sidewall 34 of the holder 22, is replaced by a holder as shown in FIG. 4A. This holder is included in a flexible envelope as shown in FIG. 4B, which flexible envelope is included in a rigid housing as shown in FIG. 4C.

The holder 22' as shown in FIG. 4A has a shape corresponding to the holder 22 as shown in FIG. 2. However, the holder comprises a first pair of opposite vertical sidewalls 66, the distance between these sidewalls at a top side 68 of the holder being greater than the distance between these sidewalls at a bottom side 70 of the holder. The holder has its bottom side again provided with a slotted outlet 26, through which, in use, the flap-shaped portion 44 of the vacuum pack 1 can project outside. In FIG. 4A, the vacuum pack as included in the holder 22' in use is shown in dotted lines.

These two opposite vertical sidewalls 66 of the holder 22' are designed for movement relative to each other. These sidewalls 66 are interconnected at their bottom sides adjacent the slotted outlet 26 by means of V-shaped springs 71 whose legs are each attached to an inside of a vertical sidewall 66. The holder 22' further comprises a second pair of opposite sidewalls 72, designed for movement relative to each other. The sidewalls 72 are of triangular design, the arrangement being such that the sidewalls 72 and 66 substantially have the shape of the vacuum pack 1 when the vacuum pack 1 is placed upside down. By means of flexible connections 74, the sidewalls 72 are connected to the sidewalls 66, with the sidewalls 72 being situated outside the space between the sidewalls 66. The flexible connections 74 can for instance be formed by flexible plastic threads.

The holder 22' is inserted into the flexible envelope 76 which forms the above-mentioned pressure means, with a fluid pressure member 78. The flexible envelope 76 is double-walled and substantially follows the shape of the vertical sidewalls of the holder 22'. The flexible envelope is open at its top and bottom sides and has hence the shape of a tapering cylinder. The flexible envelope is entirely of double-walled design. Between the double walls, an inner space 80 is present. The flexible envelope further comprises an inlet 82 for feeding a fluid, such as for instance compressed air, to the inner space 80. In this example, by means of the pressure member 78, compressed air is supplied to the inlet 82.

Figure 5:
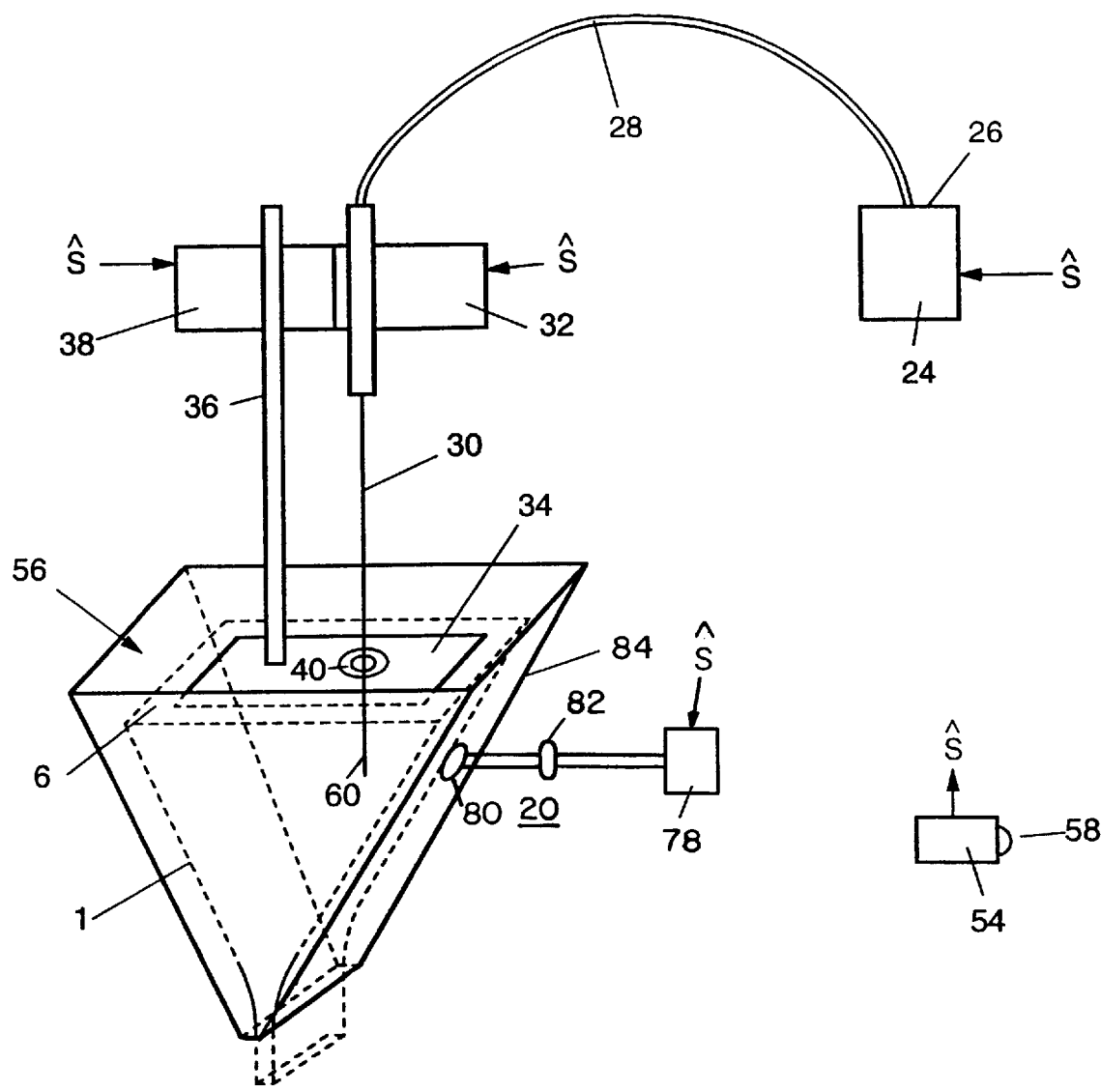
FIG. 5 shows an alternative embodiment of a system and an apparatus according to the invention for performing a method according to the invention.

In turn, the flexible envelope 76 is included into the rigid housing 84, shown in FIG. 4C. The rigid housing again generally follows the shape of the holder 22'. Provided in a sidewall 86 of the rigid housing 84 is an opening 88 through which the inlet 82 of the flexible envelope 76 can project outside. The rigid housing 86, too, has its bottom side provided with a slotted opening 90 through which the flap-shaped portion 44 of the vacuum pack 1 can project outside. The rigid housing 84 is open at its top side. When the holder 22 of FIG. 1 is replaced by the assembly consisting of the holder 22', the flexible envelope 76 and the rigid housing 84, an apparatus and system as shown in FIG. 5 is formed. In FIG. 5, the holder according to FIG. 4A and the envelope according to FIG. 4B are left out, for the sake of convenience. The operation of the system is as follows.

The control unit 54 controls the drive means 32 and the drive mechanism 38 in such a manner that the needle-shaped tube 30 and the sidewalls 34 are moved entirely upwards. A user can then place a vacuum pack 1 upside down in the holder 22'. The flap-shaped portion 44 of the vacuum pack 1 projects outside through the openings located at the bottom side of the holder 22', the flexible envelope 76 and the rigid housing 84. In this example, the vacuum pack 1 is of a type as described with respect to FIG. 3A. This explains why in the apparatus according to FIG. 5 the clamping means 48 are left out, although this is of course not essential to the invention. When the vacuum pack 1 has thus been inserted into the holder, the control unit 54 activates the drive mechanism 38 for moving the sidewall 34 downwards. In other words, the vertical sidewalls of the holder 22 on the one hand and the horizontal sidewall 34 of the holder on the other are movable relative to each other. The control unit 54 also activates the pressure member 78. This causes compressed air to be supplied to the inner space 80 of the flexible envelope 76. The flexible envelope 76 is thereby inflated. As the flexible envelope is contained within the rigid housing 84, the flexible envelope 76 will press the opposite sidewalls 66 of the holder 22' towards each other. The flexible envelope will also press the opposite sidewalls 72 towards each other. Consequently, the vacuum pack 1 is tightly enclosed. After or before the vacuum pack is tightly enclosed, or simultaneously therewith, the control unit 54 activates the drive means 32 so that the needle-shaped tube 30 is moved downwards. The free end 60 of the needle-shaped tube 30 is them pricked through the bottom 66 of the vacuum pack 1 and is eventually located within the vacuum pack. Then, the control unit 54 activates the liquid-dispensing means 24 for feeding, in this example, hot water to the vacuum pack 1. This hot water will again cause the pressure in the vacuum pack to increase substantially. As the holder 22' encloses the vacuum pack 1 tightly, the hot water will find an escape via the closing seam 14 of the vacuum pack. When the pressure is sufficiently high, the closing seam 14 will be torn open and the extract can leave the vacuum pack via the gaps 46 and flow to the bowl 61. It is observed that the control unit 54 activates the pressure member 78 in any case during a period in which hot water is fed to the vacuum pack 1.

It is also observed that the invention is by no means limited to the embodiments described hereinabove. For instance, the vacuum pack may also be of rectangular design. In that case, the holder 22, the holder 22', the flexible envelope 76 and the rigid housing 84 may likewise be rectangular, i.e. having their shapes adapted to that of the vacuum pack. Preferably, the apparatus as described hereinabove is used for preparing one cup of coffee. However, it is also possible to prepare two or more and even a pitcher of coffee by means of the apparatus. In that case, however, a larger vacuum pack should be used, because more ground coffee is necessary. Such variants are all understood to fall within the framework of the invention.

What is claimed is:

1. A system for preparing a consumable beverage, wherein a liquid and a granular material are brought together to produce the beverage, comprising:

at least one vacuum pack formed from a thin-walled and flexible packing sheet enclosing a beverage making granular material therein, the at least one vacuum pack having a free end and an opposite end, the free end defining a longitudinal narrow gap between opposite parts of the packing sheet, and a closing seam adjacent said free end interconnecting the opposite parts of the packing sheet to retain the granular material within the at least one vacuum pack, said closing seam being releasable due to liquid pressure injection into the pack to open the pack, and the distance between the opposite parts of the packaging sheet in the gap being sufficient to form a filter which blocks the granular material from leaving the vacuum pack when the closing seams is opened;

an apparatus including a holder configured to receive and fully enclose the at least one vacuum pack therein, liquid dispensing means for dispensing a liquid, and a needle-shaped tube connected to the liquid dispensing means, the needle-shaped tube including a free end for piercing the opposite end of the at least one vacuum pack and introducing the liquid into the at least one vacuum pack;

said holder including an opening at one end to allow the free end of the vacuum pack to extend below the holder when the vacuum pack is placed within the holder, and said holder further including a movable sidewall positioned to engage the opposite end of the at least one vacuum pack, and a drive mechanism connected to the movable sidewall for forcibly pressing the movable sidewall against the opposite end whereby the vacuum pack is tightly pressed against the holder; and the apparatus further including clamping plates positioned to press against the portion of the free end of the vacuum pack that extends below the holder to maintain said narrow gap between the opposite parts of the packing sheet once the closing seam is opened by the internal pressure caused by the injection of said liquid, the gap maintained by the clamping plates being sufficient to form a filter that permits the prepared beverage to pass but blocks passage of said granular material.

2. The system according to claim 1, wherein the needle-shaped tube is movable relative to the movable sidewall.

\* \* \* \* \*

UNITED STATES PATENT AND TRADEMARK OFFICE
CERTIFICATE OF CORRECTION

PATENT NO. : 6,186,051 B1
DATED : February 13, 2001
INVENTOR(S) : Aarts

It is certified that error appears in the above-identified patent and that said Letters Patent is hereby corrected as shown below:

Title page,
Item [56] References Cited, Foreign Patent Documents, insert
-- 1003716 7/1996 (NL) -- in appropriate order Signed and Sealed this Sixth Day of November, 2001

Attest:

*Nicholas P. Godici*

Attesting Officer

NICHOLAS P. GODICI
*Acting Director of the United States Patent and Trademark Office*